United States Patent
Hsu et al.

(10) Patent No.: US 9,420,459 B2
(45) Date of Patent: Aug. 16, 2016

(54) METHOD AND SYSTEM FOR REDIRECTING A REQUEST FOR IP SESSION FROM A MOBILE DEVICE

(75) Inventors: Jay Hsu, Green Brook, NJ (US); Donald William Buehler, Jr., Lafayette Hill, PA (US)

(73) Assignee: Cellco Partnership, Basking Ridge, NJ (US)

( * ) Notice: Subject to any disclaimer, the term of this patent is extended or adjusted under 35 U.S.C. 154(b) by 1309 days.

(21) Appl. No.: 13/298,107

(22) Filed: Nov. 16, 2011

(65) Prior Publication Data

US 2013/0125205 A1 May 16, 2013

(51) Int. Cl.
| | |
|---|---|
| G06F 15/16 | (2006.01) |
| H04W 12/06 | (2009.01) |
| H04W 8/26 | (2009.01) |
| H04W 8/18 | (2009.01) |
| H04L 12/24 | (2006.01) |
| H04W 4/24 | (2009.01) |
| H04W 88/06 | (2009.01) |
| H04L 29/12 | (2006.01) |
| H04W 12/08 | (2009.01) |
| H04L 29/08 | (2006.01) |
| H04L 29/06 | (2006.01) |

(52) U.S. Cl.
CPC ......... *H04W 12/06* (2013.01); *H04L 29/12188* (2013.01); *H04L 29/12245* (2013.01); *H04L 29/12283* (2013.01); *H04L 41/0806* (2013.01); *H04W 4/24* (2013.01); *H04W 8/183* (2013.01); *H04W 8/26* (2013.01); *H04W 8/265* (2013.01); *H04W 12/08* (2013.01); *H04W 88/06* (2013.01); *H04L 61/2061* (2013.01); *H04L 63/08* (2013.01); *H04L 67/02* (2013.01)

(58) Field of Classification Search
CPC ....... H04W 12/06; H04W 12/08; H04W 4/24; H04W 88/06; H04W 8/183; H04W 8/26; H04W 8/265; H04L 29/12188; H04L 29/12245; H04L 29/12283; H04L 41/0806; H04L 61/2061; H04L 63/08; H04L 67/02
USPC .......................................................... 709/227
See application file for complete search history.

(56) References Cited

U.S. PATENT DOCUMENTS

| | | | | |
|---|---|---|---|---|
| 6,470,389 | B1 * | 10/2002 | Chung | ............... H04L 29/06 709/227 |
| 8,869,271 | B2 * | 10/2014 | Jayaraman | ................. 726/22 |
| 2004/0193513 | A1 * | 9/2004 | Pruss | ............... G06Q 20/28 705/30 |

(Continued)

OTHER PUBLICATIONS

Ksplice Post, Coffee Shop Internet Access, Oracle Blog, Jan. 17, 2011, pp. 1-7.*

*Primary Examiner* — Oleg Survillo (57) ABSTRACT

A request for establishing an IP session from a mobile device to be activated and connected to a cellular network is redirected to a web portal or platform of the cellular network. When the mobile device sends an authentication request for requesting establishment of an IP session to the cellular network, the mobile device receives a restricted IP address from the cellular network if the mobile device is not currently authorized for communication via the cellular network. A reverse domain name system lookup is performed on the restricted IP address to find a host name of a web portal or platform of the cellular network corresponding to the restricted IP address. The mobile device determines whether or not redirection of an IP communication request to the web portal or platform of the cellular network is to occur based on the host name.

17 Claims, 3 Drawing Sheets

(56) References Cited

U.S. PATENT DOCUMENTS

| | | | | |
|---|---|---|---|---|
| 2008/0114857 A1* | 5/2008 | Snider | G06Q 30/02 | 709/217 |
| 2008/0140542 A1* | 6/2008 | Perron | G06Q 20/3224 | 705/27.1 |
| 2009/0013089 A1* | 1/2009 | Sullivan | H04L 67/2814 | 709/238 |
| 2009/0077637 A1* | 3/2009 | Santos | H04L 63/1483 | 726/5 |
| 2009/0158148 A1* | 6/2009 | Vellanki | H04L 41/0806 | 715/700 |
| 2009/0181662 A1* | 7/2009 | Fleischman | H04W 4/001 | 455/419 |
| 2010/0281524 A1* | 11/2010 | Ghittino | H04L 63/08 | 726/5 |
| 2010/0293249 A1* | 11/2010 | Beaulieu | H04L 67/2823 | 709/219 |
| 2011/0040867 A1* | 2/2011 | Kalbag | H04W 12/06 | 709/224 |
| 2011/0173682 A1* | 7/2011 | Perry | H04W 12/06 | 726/4 |
| 2011/0176488 A1* | 7/2011 | Liebsch | H04L 29/12311 | 370/328 |
| 2012/0042058 A1* | 2/2012 | Shaikh | H04L 29/12188 | 709/222 |
| 2012/0224485 A1* | 9/2012 | Payyappilly | H04L 12/4633 | 370/235 |
| 2012/0233351 A1* | 9/2012 | Gorgens | H04L 61/1511 | 709/245 |
| 2014/0164630 A1* | 6/2014 | Wu | H04W 76/02 | 709/227 |
| 2014/0198641 A1* | 7/2014 | Perkuhn | H04W 4/18 | 370/230 |

* cited by examiner

METHOD AND SYSTEM FOR REDIRECTING A REQUEST FOR IP SESSION FROM A MOBILE DEVICE

BACKGROUND

In recent years, mobile wireless communications have become increasingly popular. While desktop computers will likely remain a part of the network for a substantial period of time, mobile devices such as laptops, personal digital assistants ("PDAs"), smartphones, cell phones, tablet PCs and other portable computers are rapidly gaining popularity. Many mobile devices have interfaces enabling communications via local area network (LAN) wireless access points (hereinafter "wireless hotspot networks" or "hotspots") designed to allow transportable devices to connect to wireless networks, such as IEEE 802.11 ("WiFi") network type wireless access points. Such hotspots frequently provide Internet access to a mobile device user, and mobile device users may thus connect to hotspots for the purpose of attaining Internet access. Mobile networks, which provide two way radio communication links via base stations, also provide Internet access to many of the modern mobile devices.

The mobile devices with capability of accessing to a mobile network and the hotspot network usually are sold at a point of sale (POS) of the mobile network carrier and activated for Internet access at the POS at the time of purchase. Recently, sales channels have diversified such that buyers can buy the mobile devices via websites and markets other than the POS of the mobile network carrier. In these later purchase channels, a buyer purchases only a mobile device via a website or another non-carrier market without buying a data plan to access the mobile network, therefore the buyer needs to activate the mobile device on buyer's own by buying data plan of the mobile network. To facilitate this type of user activation, the mobile devices thus should have a limited accessibility to only websites or platforms of the appropriate mobile network carrier for activation of the mobile devices. General access via the hotspot or mobile network becomes available only after activation.

In another scenario, a mobile device user has a previously activated mobile device with a prepaid data plan for the mobile network. In such a case, the user is not allowed access to the mobile network, i.e. the device is effectively de-activated, when the prepaid balance has been used up. The mobile network carrier, however, wants to provide limited user access to only a website or platform of the carrier for the user to buy another prepaid data plan (to "replenish" the prepaid amount), and the carrier desires to restrict the user's access to other websites until the device is re-activated.

In both cases, even if the mobile device tries to connect an IP session with other websites such as "Google" or "Yahoo," the mobile device having limited access will need to go only to the website or platform of the mobile network carrier for activation of the mobile device. A conventional way to redirect the IP session requests of the mobile device to the web portal or platform of the mobile network is to wait for two failures of accessing a desired website, after which the mobile device is redirected to a website of the mobile network carrier for activation of the mobile device. This conventional redirection technique is slow since the redirection is performed only after two access failures, and this technique is unreliable because the failure of access may be caused by reasons other than the non-authorization of IP session communication or low usage of data plan balance such as web site or Internet service outages. Also, the reliance on two failed attempts provides a poor customer experience to the device user.

A need exists for providing a method and a system for redirecting an IP session establishment request from a mobile device, which is not authorized for wireless communication to a web portal or platform via which the mobile device activates wireless communication via a cellular network.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples described in detail below relate to a method and a system for redirecting a request for an IP session (also referred to as an IP communication request) from the mobile device to a web portal or platform of the cellular network for activating communication of the mobile device via the cellular network using a reverse domain name system (DNS) lookup.

The method redirects, if desired, a request for establishing an IP session from a mobile device through a cellular network. The mobile device sends an authentication request for requesting establishment of an IP session, to the cellular or hotspot network, and in response receives an IP address assigned to the mobile device from the network. The received IP address is a restricted IP address if the mobile device is a potential customer but is not yet authorized for communication via the cellular network, whereas the received IP address is a normal IP address if the mobile device is authorized for communication via the cellular network. Authorization, as used herein, refers to full authorization that enables the mobile device to use the cellular network for all allowable communication (e.g., voice, data, messaging). A mobile device that is a potential customer but is not yet fully authorized for communication via the cellular network is granted partial authorization, i.e., it is still permitted to communicate to obtain full authorization by obtaining an IP address, etc. to allow communication through the network with an activation platform.

Whether the mobile device is authorized or not, the IP address is dynamically assigned from a group of IP addresses. The group of IP addresses from which the IP address is dynamically assigned is dependent on the authorization result. A reverse domain name system (DNS) lookup of the dynamically assigned IP address is performed. In particular, the mobile device sends the assigned IP address to a DNS server. The DNS server finds a host name associated with the assigned IP address and returns the host name to the mobile device. The mobile device decides whether or not to redirect based on the obtained host name. In response to an IP communication using the assigned IP address, such as a Hypertext Transfer Protocol Secure (HTTPS) request, from the mobile device, the mobile device redirects the request to a platform of the cellular network if the host name is related to the platform of the cellular network. The mobile device is directed to a website identified in the IP communication request if the host name is not related to the platform of the cellular network.

If a mobile device sends an IP communication request out to access a desired website, a mobile device that is not yet allowed full network communication (e.g. not yet active or with insufficient prepaid balance) is redirected to the platform of the cellular network. Using this platform, the mobile device goes through a procedure to become fully authorized for communication via the cellular network. In an example, the mobile device is able to be activated by the cellular network or the user is allowed to buy prepaid data plan for initial or continued communication via the cellular network. The redirection mechanism efficiently and precisely redirects the mobile device, which is not authorized for communication via the cellular network, to the web portal or platform of the cellular network.

Figure 1:
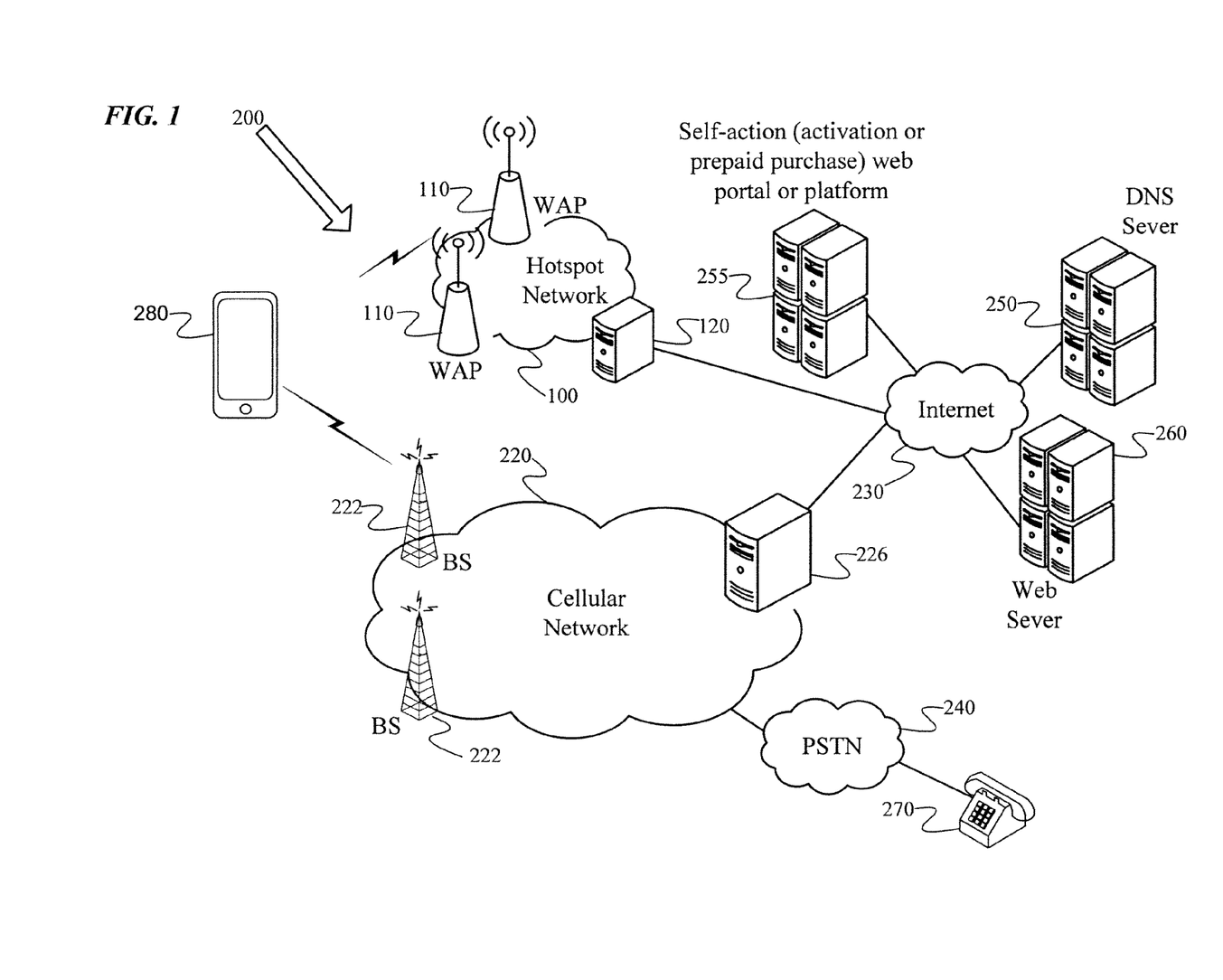
FIG. 1 is a functional block diagram of an exemplary system which may implement a method for redirecting an IP session request of a mobile device to a web portal or platform of a wireless network for self activation.

Reference now is made in detail to the examples illustrated in the accompanying drawings and discussed below. FIG. 1 is a functional block diagram of an exemplary system 200 that supports various mobile communication services and which may implement a method for redirecting an IP communication of a mobile device to a web portal or platform of a wireless network for self activation. The illustrated system includes a mobile device 280. The mobile device 280 may be a laptop, a personal digital assistant ("PDA"), a smartphone, a tablet PC or another portable device designed to connect to a wireless network.

The exemplary system includes two networks 100 and 220 operated in accord with different technology standards. Hotspot network 100 may include wireless access point (WAPs) 110 for wireless LAN communications with wireless device(s) 280. For example, WAP 110 may be a transceiver compatible with one or more current wireless standards, such as 802.11 (WiFi). WAP 110 may connect to a wired connection, such as an Ethernet network. WAP 110 may also function as a network switch for prioritizing traffic usage, or this function may be performed by a separate device (not separately shown). Although the drawing shows only two WAPs 110, for convenience, it should be apparent that actual implementations of the network 100 may include any number of additional WAPs.

Hotspot network 100 may also include a gateway 120. The gateway 120 may govern all communications traffic between WAP 110 and the Internet 230.

The cellular network 220 allows a user to operate the mobile device 280 to access the Internet 230, including accessing text and multimedia messages, e-mail, web browsing, programming and media downloading, etc. Internet 230 may refer to the public packet switched data communication network commonly referred to as the "Internet," although private 'intranet' communication may also be provided, e.g. for enterprise users.

The illustrated cellular network 220 also includes a gateway 226. The gateway 226 governs all communications traffic between the base station(s) 222 and the Internet 230. The exemplary cellular network 220 uses gateway 226 to conduct authentication checks before a mobile device user may access the Internet 230, although other platforms may be involved, e.g. to store databases of customer/device information. Authentication may include entering billing information, other user identification information, an agreement to terms of service, etc. Gateway 226 may enforce authentication by, for example, restricting access to the Internet 230 until the user authenticates. In later detailed processing examples, the Internet 230 access restriction involves redirecting the mobile device user's Internet requests to a web portal or platform 255 of the operator or carrier cellular network 220. Such a redirection process is implemented by logic stored in the mobile device 280.

If the mobile device 280 is not authorized for communication via the cellular network 220, e.g., because the device has not been activated or a prepaid data plan balance of the mobile device 280 is used up, the cellular network responds to a request for packet session authentication by returning a restricted IP address to the mobile device as the address assigned to the mobile device for the requested packet session. The mobile device 280 responds to the restricted access address assignment to redirect any requests of a subsequent user communication to the platform 255 of the cellular network operator, where the mobile device user can activate the mobile device 280 for communication via the cellular network 220.

If the mobile device 280 is authorized for communication via the cellular network 220 and the prepaid data plan balance is not used up, the gateway 226 resolves the IP session establishment requests by directing the mobile device 280 to a requested web page, for example on web server 260.

Mobile network 220 may provide mobile telephone communications as well as Internet 230 services. For example, mobile network 220 may connect to the public switched telephone network (PSTN) 240 (eventually connecting to PSTN device 270) and public packet-switched data communication networks such as the Internet 230. Packet-switched communications via mobile network 220 may support a variety of services such as communications of text and multimedia messages, e-mail, web browsing, programming and media downloading, etc. System 200 shows a web server 260 by way of example. Mobile device 280 may connect to mobile network 220 through the cellular base station 222.

Figure 2:
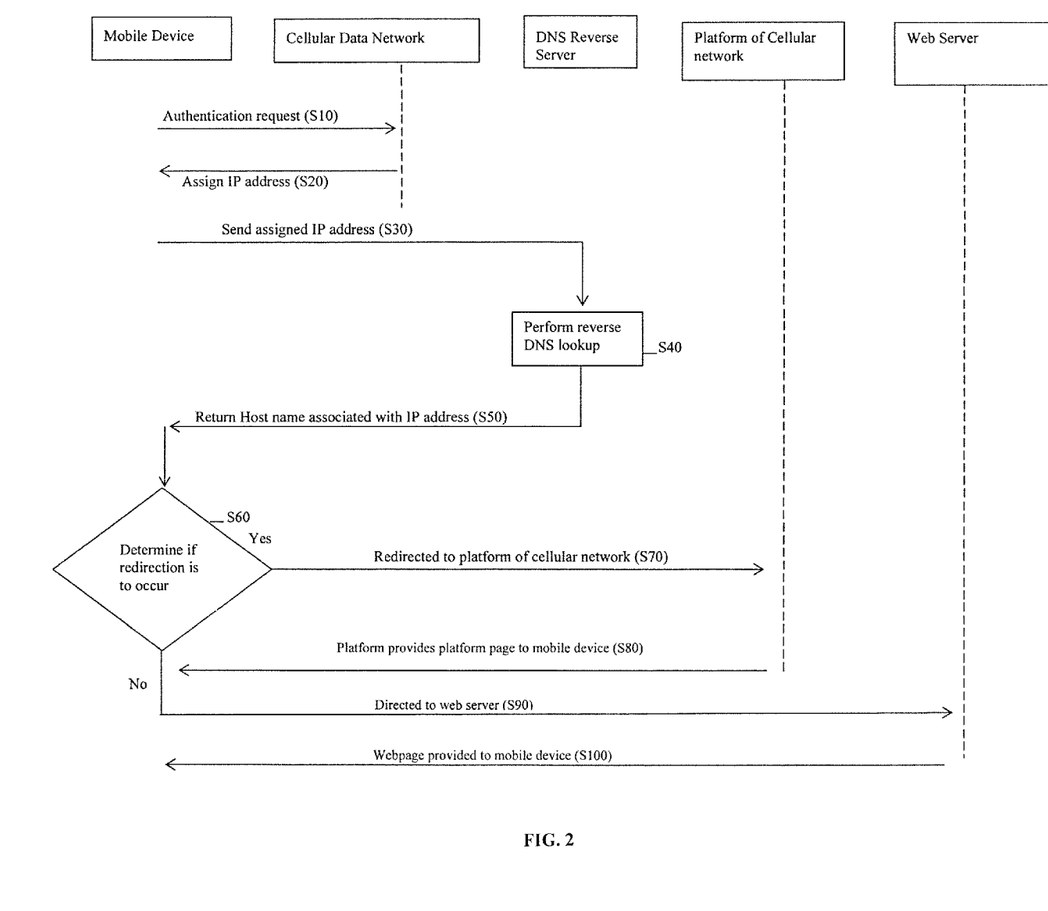
FIG. 2 illustrates a process for redirection of a request of a mobile device to a platform of a wireless network for self activation.

FIG. 2 illustrates a process for determining whether an HTTPS request of a mobile device to a platform 255 of a wireless network is to be redirected for self activation and redirecting the mobile device to the platform if the redirection is necessary. Note that while the example shown in FIG. 2 refers to an HTTPS request, the redirection may occur when other types of IP communications using the assigned IP address are transmitted by the mobile device. Such IP communications include, for example, HTTP requests and telnet communications among others.

A mobile device 280 sends an authentication request to the cellular network system via the cellular network 220 or the hotspot network 100 when the mobile device 280 is powered on. (S10) The authentication request has a network authentication identifier for the mobile device 280 by which the cellular network system identifies whether the mobile device 280 is authorized for establishment of an IP session. The authentication request asks the cellular network system to authenticate establishment of an IP session for the mobile device 280.

The cellular network system refers to the gateway 226 storing mobile devices users' authentication records. The gateway 226 determines whether the mobile device is authorized for normal (customer paid) communication via the cellular network. Note that although the gateway 226 is described in this example as providing authentication, such as in a 3G network, other devices may be used to provide authentication—such as a Home Subscriber Server (HSS) in a 4G network.

If the mobile device user is not authorized for the communication but is a potential customer, the cellular network system temporarily authorizes limited communication by assigning a restricted IP address from predefined restricted IP address pool to the mobile device 280. The gateway 226 may determine that a mobile device is a potential customer through one or more methods, such as provisioning or using the IMEI (international mobile equipment identifier) and/or ESN (electronic serial number) of the device. If the mobile device is authorized for normal communication, the system assigns a non-restricted IP address from a pool of non-restricted IP addresses to the mobile device 280.

In either case, the cellular network system sends the assigned IP address to the mobile device 280. (S20)

The system has a limited pool of restricted IP addresses, and assigns one of the restricted IP addresses for each non-authorized mobile device. In cellular networks such as 3G, a restricted IP address is dynamically assigned from the restricted IP pool to the mobile device 280. The IP addresses are usually allocated in continuous fashion using one or more IP address blocks. The size of the restricted IP address pool may be determined by statics of IP address utilization e.g., when a predetermined threshold of IP address usage is reached, another predetermined size block of IP addresses are set aside and added to the pool.

The domain name system (DNS) provides a mapping of textual host names to numeric IP addresses. The restricted IP address, for example 1.199.199.199, has an associated host name, e.g. xxxx.vzw.com. A non-restricted IP address assigned to the mobile device, for example, 192.168.123.106, has an associated host name, e.g. mtn1.vzw.com. The assignment of the restricted IP address and associated host name triggers redirection by the mobile device 280 of data communications from the mobile device to the platform of the cellular network. The assignment of a non-restricted IP address and associated host name indicates to the mobile device 280 that the mobile device 280 is permitted to communicate via the cellular network and that no redirection is to occur.

Returning to the process of FIG. 2, upon receiving the assigned IP address (whether or not it is restricted), the mobile device 280 sends the assigned IP address to a reverse Domain Name System (DNS) server 250. The reverse DNS server 250 performs a reverse DNS lookup on the assigned IP address to thereby obtain a host name associated with the assigned IP address. (S40) The reverse DNS server 250 retrieves a host name corresponding to the assigned IP address. In this example, if the assigned IP address is restricted, a restricted host name will be retrieved, whereas if the assigned IP address is non-restricted, a non-restricted host name will be retrieved. The retrieved host name is then sent to the mobile device 280. (S50)

The mobile device 280 determines if redirection of the mobile device 280 to the platform of the cellular network is to occur, based on the obtained host name. (S60) If the host name is restricted, in this example "xxxx.vzw.com," redirection of the mobile device 280 is to occur. If the host name is not restricted, in this example "mtn1.vzw.com," redirection of the mobile device is not to occur. The mobile device is configured to distinguish whether the host name was obtained by the reverse DNS lookup. An initial assignment of an IP address as part of an authentication procedure may trigger the reverse DNS lookup and determination whether redirection is to occur. Thus, the determination by the mobile device 280 may occur only once, immediately or shortly after the reverse DNS lookup (but in any event before accessing an IP website).

After the mobile device 280 determines that redirection is to occur, when a user requests access to a desired website (for example, "www.google.com"), the mobile device 280 redirects an HTTPS request provided in response the user input identifying the desired website to the platform 255 of the cellular network for activation of the mobile device 280. (S70) The platform 255 of the cellular network provides a self-activation interface mechanism to the mobile device 280 in response to the redirected HTTPS request through the gateway 226 of the cellular network 220 or the gateway 120 of the hotspot network 100. (S80) For example, if activation involves setting up a new data plan subscription or payment of a new or replenishment amount for a prepaid plan, the platform 255 may send data for one or more pages and receive responses allowing the user to conduct the appropriate transaction via user interface elements of the mobile device 280. For an initial activation, any provisioning data that should be loaded into the mobile device is sent to and stored in the mobile device after the user completes the subscription transaction.

If redirection is not to occur, the mobile device 280 is directed to a normal web server 260 the of user's desired website, in this example "www.google.com." (S90) The web server 260 provides a web page of the user's desired website to the mobile device in response to the HTTPS request. (S100)

Figure 3:
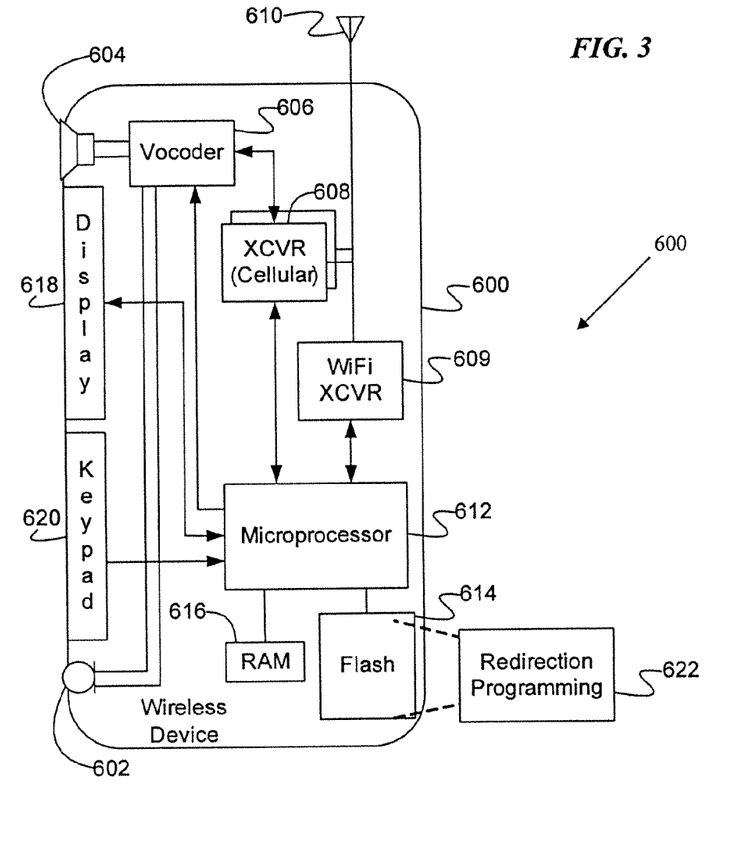
FIG. 3 provides a block diagram illustration of an exemplary mobile device.

An application program for redirecting a HTTPS request and resolving a HTTPS request according the processes of FIG. 2 is installed in a memory of the mobile device 280. FIG. 3 provides a block diagram illustration of an exemplary mobile device 600, which may be used as the mobile device 280.

Although the mobile device 600 may be a smart-phone or a tablet PC or may be incorporated into another device, such as a portable personal computer, personal digital assistant (PDA), etc., for discussion purposes, the illustration shows the mobile device 280 in the form of a handset or feature phone. The handset embodiment of the mobile device 600 functions as a normal digital wireless telephone station. For that function, the mobile device 600 includes a microphone 602 for audio signal input and a speaker 604 for audio signal output. The microphone 602 and speaker 604 connect to voice coding and decoding circuitry (vocoder) 606. For a voice telephone call, for example, the vocoder 606 provides two-way conversion between analog audio signals representing speech or other audio and digital samples at a compressed bit rate compatible with the digital protocol of wireless telephone network communications or voice over packet (Internet protocol) communications.

For digital wireless communications, the mobile device 600 also includes at least one of digital transceivers ("XCVR") 608 and 609. The mobile device 600 is a multi-mode device capable of operations on various technology type networks, such as the networks 210 and 220. The concepts discussed here encompass embodiments of the mobile device 600 utilizing any digital transceivers that conform to current or future developed digital wireless communication standards.

In the example, the transceiver 608 is compatible with one or more standards of communication implemented in the public wide area mobile network 220, such as CDMA, 1×RTT, EvDO, LTE, GSM or UMTS. The transceiver 609 is compatible with one or more standards of communication implemented in wireless local area networks (WLANs), such as one of the WiFi standards and/or WiMAX.

The transceiver 608 provides two-way wireless communication of information, such as vocoded speech samples and/or digital message information, in a selected one of the technology modes. The transceiver 608 also sends and receives a variety of signaling messages in support of the various voice and data services provided via the mobile device 600 and the communication network. Each transceiver 608 connects through radio frequency ("RF") send and receive amplifiers (not separately shown) to an antenna 610.

The transceiver 609 also provides two-way wireless communication of information, such as vocoded speech samples and/or digital message information, in a selected one of the technology modes. The transceiver 609 sends and receives a variety of signaling messages in support of the various voice and data services provided via the mobile device 600 and the communication network. The transceiver 609 connects through RF send and receive amplifiers (not separately shown) to an antenna 610. In the example, transceiver 609 is configured for RF communications in accord with a wireless LAN protocol (a hotspot), such as WiFi. For the network selection function, network communications via the transceiver 609 and antenna 610 may include detection of the available wireless LAN technology types in any given service area and selection of an available network for communications. Mobile device 600 may use transceiver 609 to communicate with a hotspot network, and may use transceiver 608 to communicate with a cellular network 220.

The mobile device 600 includes a display 618 for displaying messages, menus, call related information dialed by the user, calling party numbers, displaying applications and web pages, etc. A keypad 620 enables dialing digits for voice and/or data calls as well as generating selection inputs, for example, as may be keyed in by the user based on a displayed menu or as a cursor control and selection of a highlighted item on a displayed screen. The display 618 and keypad 620 are the physical elements providing a textual or graphical user interface. In addition to normal telephone and data communication related input/output, these elements also may be used for display of menus and other information to the user and user input of selections, if needed during a system selection or login operation or during a software download operation, including any such operations that may be involved in a self-activation of the device or a purchase of a new prepaid balance for the device. Various combinations of the keypad 620, display 618, microphone 602 and speaker 604 may be used as the physical input output elements of the GUI, for multimedia (e.g. audio and/or video) communications. Other user interface elements may be used, such as a stylus and touch sensitive display screen, as in a PDA or smart phone.

A microprocessor 612 serves as a programmable controller for the mobile device 600, in that it controls all operations of the mobile device 600 in accord with programming that it executes, for all normal operations, and for operations involved in automatically detecting Internet redirection. In the example, the mobile device 600 includes flash type program memory 614, for storage of various "software" or "firmware" program routines and mobile configuration settings. The mobile device 600 may also include a non-volatile random access memory (RAM) 616 for a working data processing memory. Of course, other storage devices or configurations may be added to or substituted for those in the example. In a present implementation, the flash type program memory 614 stores firmware such as a boot routine, device driver software, an operating system, call processing software and vocoder control software, and any of a wide variety of other applications, such as client browser software and short message service software. The memories 614 and 616 also store various data, such as telephone numbers and server addresses, downloaded data such as multimedia content, and various data input by the user. Programming stored in the flash type program memory 614, sometimes referred to as "firmware," is loaded into and executed by the microprocessor 612 to configure the device to implement various device functions. The executable programming stored in the flash memory 614 may include automatic redirection programming 622, to enable the device 600 to implement device aspects of the procedures like those discussed above relative to FIG. 2.

Figure 4:
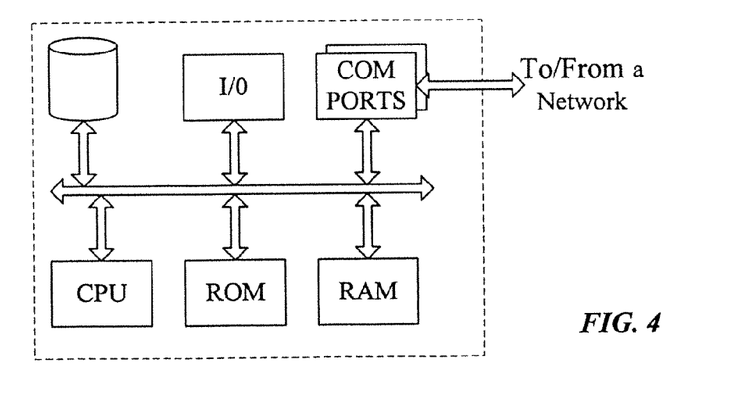
FIG. 4 provides a functional block diagram illustration of a general purpose computer hardware platform.

FIG. 4 provides a functional block diagram illustration of a general purpose computer hardware platform. More specifically, FIG. 4 illustrates a network or host computer platform, as may typically be used to implement a server, such as any of the servers/platforms 226, 250, 255 and 260. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. The software programming relating to the redirection detection techniques discussed herein may be downloaded and/or updated from a computer platform, for example, from a server (e.g. FIG. 1) or the like communicating with the mobile device (e.g. FIG. 3) via the network (e.g. FIG. 1). Although special purpose devices may be used to support the download functions, such devices also may be implemented using one or more hardware platforms intended to represent a general class of data processing device commonly used to run "server" and/or "client" programming so as to implement the functions discussed above, albeit with an appropriate network connection for data communication.

Hence, aspects of the methods of redirecting an IP communication (e.g., HTTPS) request of a mobile device to a web portal or platform of a wireless network for self activation outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible non-transitory storage medium, a carrier wave medium, or a physical transmission medium. Non-volatile storage media include, for example, optical or magnetic disks, such as any of the storage devices in any computer(s) or the like, such as may be used to implement the information flow, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer, CPU or other processor can read programming code and/or data. Many of these forms of computer readable media may be involved in carrying one or more sequences of one or more instructions and/or associated list data to a processor for execution.

While, in the above example, the redirection is determined based on the host name obtained from the reverse DNS lookup, determination of the redirection may be made based directly on the IP address assigned to the mobile device (as opposed to indirectly on the IP address via lookup of the host name). In the case based directly on the IP address, if the IP address assigned to the mobile device is one from the restricted IP pool, the redirection is to occur. Otherwise, the redirection is not to occur. This approach eliminates the call to the reverse DNS lookup server. By using host names, however, an element of commonality may exist even if the number/format of restricted IP addresses changes. As the number/format of restricted IP addresses may change frequently, the use of host names rather than IP addresses may at least reduce software updates provided to the mobile devices to enable each mobile device to recognize whether or not redirection is to occur. In other examples, both methods may be used in combination, e.g., to provide backup functionality. Similarly, in other examples, the determination (whether reverse DNS lookup and/or via IP address) may be accessed more often than once, during an initial determination. For example, the determination may occur every time an HTTP (or HTTPS) request is initiated by the mobile device.

The use, by the mobile device, of an IP address/host name assigned to the mobile device to determine and establish redirection provides an effective and reliable method by which the mobile device is able to be activated. The mobile device that is not currently authorized is automatically redirected to a website for activation upon any IP session request, unlike the conventional method in which the mobile device is redirected only after multiple access failures, which may be caused by reasons unrelated to activation issues.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for redirecting a request for establishing an IP session from a mobile device, the method comprising:

(a) sending, by the mobile device through a cellular network or a hotspot network to the cellular network, an authentication request for establishing an Internet Protocol (IP) packet session;
(b) receiving, by the mobile device in response to the authentication request, an IP address assigned to the mobile device from the cellular network for use by the mobile device, the IP address assigned based on a result of the authentication request;
(c) sending, by the mobile device in response to receiving the assigned IP address, the assigned IP address to a reverse domain name system (DNS) server to perform a reverse DNS lookup of the assigned IP address;
(d) receiving, by the mobile device from the reverse DNS server and based on the reverse DNS lookup of the assigned IP address by the reverse DNS server, a host name associated with the assigned IP address;
(e) determining, by the mobile device, whether redirection of the mobile device to a platform of the cellular network for activation of the mobile device is to occur based on the IP address assigned to the mobile device from the cellular network for use by the mobile device by
determining that the redirection is to occur if the assigned IP address is a restricted IP address that causes the reverse DNS lookup to obtain a restricted host name from the reverse DNS server, and
determining that the redirection is not to occur if the assigned IP address is a non-restricted IP address that causes the reverse DNS lookup to obtain a non-restricted host name from the reverse DNS server; and
(f) redirecting, by the mobile device in response to an IP communication request provided by a user of the mobile device and only if it is determined that the redirection is to occur, an IP session of the mobile device from the user's requested web server identified in the IP communication request to the platform of the cellular network.

2. The method of claim 1, wherein:
when the assigned IP address is a restricted IP address, the restricted IP address is dynamically assigned from a pool of restricted IP addresses, and
assignment of any of the restricted IP addresses in the pool of restricted IP addresses causes the reverse DNS server to return the restricted host name.

3. The method of claim 2, wherein the restricted host name returned by the DNS server is a same restricted host name for all of the restricted IP addresses in the pool of restricted IP addresses.

4. The method of claim 1, wherein:
when the assigned IP address is a non-restricted IP address, the non-restricted IP address is dynamically assigned to the mobile device from a pool of non-restricted IP addresses, and
assignment of any of the non-restricted IP addresses in the pool of non-restricted IP addresses causes the reverse DNS server to return the non-restricted host name.

5. The method of claim 1, further comprising activating the mobile device for communication through the cellular network at the platform of the cellular network, via the IP session of the mobile device redirected in step (f).

6. The method of claim 1, wherein the redirecting of the IP session is performed based on at least one of the mobile device not yet being activated for communication service via the cellular network and a prepaid data plan balance for communication service of the mobile device being used up.

7. The method of claim 1, wherein the redirecting of the IP session of the mobile device is implemented by logic stored in the mobile device and comprises redirecting a subsequent user communication to the platform of the cellular network.

8. A mobile device comprising:
a wireless transceiver configured for communication via a cellular network;
a programmable controller coupled to the wireless transceiver;
a non-transitory storage medium coupled to the controller; and
programming stored in the medium, wherein execution of the programming by the controller causes the controller to operate the mobile device to perform functions comprising functions to:
(a) send, by the mobile device through a cellular network or a hotspot network to the cellular network, an authentication request for establishing an Internet Protocol (IP) packet session;
(b) receive, by the mobile device in response to the authentication request, an IP address assigned to the mobile device from the cellular network for use by the mobile device, the IP address assigned based on a result of the authentication request;
(c) send, by the mobile device in response to receiving the assigned IP address, the assigned IP address to a reverse domain name system (DNS) server to perform a reverse DNS lookup of the assigned IP address;
(d) receive, by the mobile device from the reverse DNS server and based on the reverse DNS lookup of the assigned IP address by the reverse DNS server, a host name associated with the assigned IP address;
(e) determine, by the mobile device, whether redirection of the mobile device to a platform of the cellular network for activation of the mobile device is to occur based on the IP address assigned to the mobile device from the cellular network for use by the mobile device by
determining that the redirection is to occur if the assigned IP address is a restricted IP address that causes the reverse DNS lookup to obtain a restricted host name from the reverse DNS server, and
determining that the redirection is not to occur if the assigned IP address is a non-restricted IP address that causes the reverse DNS lookup to obtain a non-restricted host name from the reverse DNS server; and
(f) redirect, by the mobile device in response to an IP communication request provided by a user of the mobile device and only if it is determined that the redirection is to occur, an IP session of the mobile device from the user's requested web server identified in the IP communication to the platform of the cellular network.

9. The mobile device of claim 8, wherein:
when the assigned IP address is a restricted IP address, the restricted IP address is dynamically assigned from a pool of restricted IP addresses,
assignment of any of the restricted IP addresses in the pool of restricted IP addresses causes the reverse DNS server to return the restricted host name, and
the determining that redirection is to occur comprises recognizing the received host name as the restricted host name.

10. The mobile device of claim 8, wherein when the assigned IP address is a non-restricted IP address, the non-restricted IP address is dynamically assigned to the mobile device from a pool of non-restricted IP addresses,
assignment of any of the non-restricted IP addresses in the pool of non-restricted IP addresses causes the reverse DNS server to return the non-restricted host name, and the functions further include the mobile device communicating via the cellular network without causing redirection of any request of the mobile device.

11. The mobile device of claim 8, wherein the functions further comprises a function to:
   activate the mobile device for communication through the cellular network at the platform of the cellular network, via the IP session of the mobile device redirected in step (f).

12. The mobile device of claim 8, wherein the redirecting of the IP session is performed based on at least one of the mobile device not yet being activated for communication service via the cellular network and a prepaid data plan balance for communication service of the mobile device being used up.

13. A system for redirecting a request for establishing an Internet Protocol (IP) packet session from a mobile device, the system comprising:
   a cellular network including a gateway configured to manage IP sessions between the mobile device and the Internet, wherein the gateway assigns an IP address to the mobile device for use by the mobile device in response to an authentication request for an IP session from the mobile device; and
   the mobile device, wherein the mobile device is configured to:
      send, in response to receiving the assigned IP address, the assigned IP address to a reverse domain name system (DNS) server to perform a reverse DNS lookup of the assigned IP address,
      receive, from the reverse DNS server and based on the reverse DNS lookup of the assigned IP address by the reverse DNS server, a host name associated with the assigned IP address,
      determine whether redirection of the mobile device to a platform of the cellular network for activation is to occur based on the IP address assigned to the mobile device for use by the mobile device by
         determining that the redirection is to occur if the assigned IP address is a restricted IP address that causes the reverse DNS lookup to obtain a restricted host name from the reverse DNS server, and
         determining that the redirection is not to occur if the assigned IP address is a non-restricted IP address that causes the reverse DNS lookup to obtain a non-restricted host name from the reverse DNS server, and
      redirect, in response to an IP communication request provided by a user of the mobile device and only if it is determined that the redirection is to occur, an IP session of the mobile device from the user's requested web server identified in the IP communication request to the platform of the cellular network.

14. The system of claim 13, wherein:
   when the assigned IP address is a restricted IP address, the restricted IP address is dynamically assigned from a pool of restricted IP addresses, and
   assignment of any of the restricted IP addresses in the pool of restricted IP addresses causes the reverse DNS server to return the restricted host name.

15. The system of claim 13, wherein:
   when the assigned IP address is a non-restricted IP address, the non-restricted IP address is dynamically assigned to the mobile device from a pool of non-restricted IP addresses,
   assignment of any of the non-restricted IP addresses in the pool of non-restricted IP addresses causes the reverse DNS server to return the non-restricted host name, and
   the mobile device is further configured to communicate via the cellular network without causing redirection of the request of the mobile device upon receiving the non-restricted host name.

16. The system of claim 13, wherein the mobile device is configured to be activated for communication through the cellular network at the platform of the cellular network, via the IP session of the mobile device that was redirected.

17. The system of claim 13, wherein the redirecting of the IP session is performed based on at least one of the mobile device not yet being activated for communication service via the cellular network and a prepaid data plan balance for communication service of the mobile device being used up.

* * * * *